(No Model.)  2 Sheets—Sheet 1.

O. D. WOODRUFF.
MEAT CUTTER.

No. 485,854. Patented Nov. 8, 1892.

(No Model.) 2 Sheets—Sheet 2.

O. D. WOODRUFF.
MEAT CUTTER.

No. 485,854. Patented Nov. 8, 1892.

UNITED STATES PATENT OFFICE.

OLIVER D. WOODRUFF, OF SOUTHINGTON, CONNECTICUT, ASSIGNOR TO THE ENTERPRISE MANUFACTURING COMPANY OF PENNSYLVANIA, OF PHILADELPHIA, PENNSYLVANIA.

MEAT-CUTTER.

SPECIFICATION forming part of Letters Patent No. 485,854, dated November 8, 1892.

Application filed June 10, 1892. Serial No. 436,261. (No model.)

*To all whom it may concern:*

Be it known that I, OLIVER D. WOODRUFF, of Southington, in the county of Hartford and State of Connecticut, have invented a new Improvement in Meat-Cutters; and I do hereby declare the following, when taken in connection with accompanying drawings and the letters of reference marked thereon, to be a full, clear, and exact description of the same, and which said drawings constitute part of this specification, and represent, in—

Figure 1:
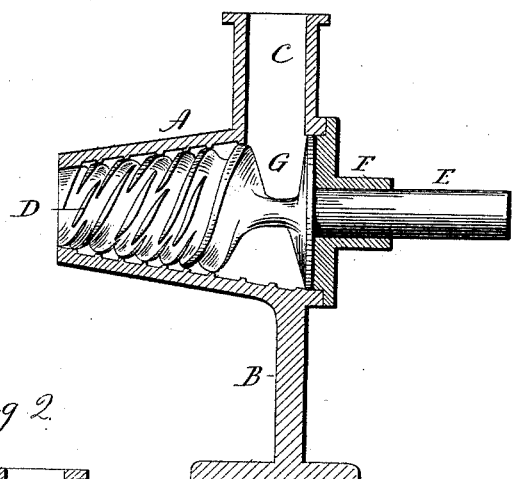
Figure 2:
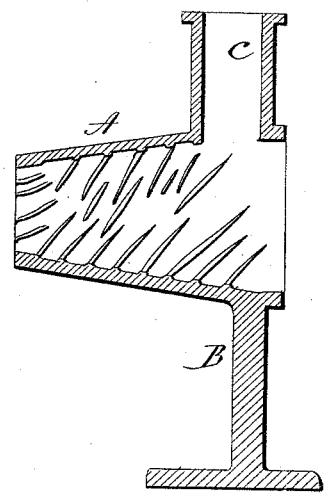
Figure 3:
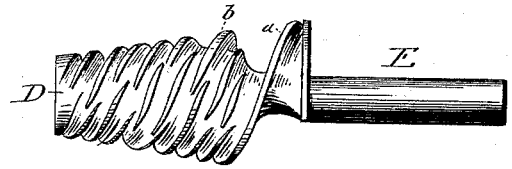
Figure 4:
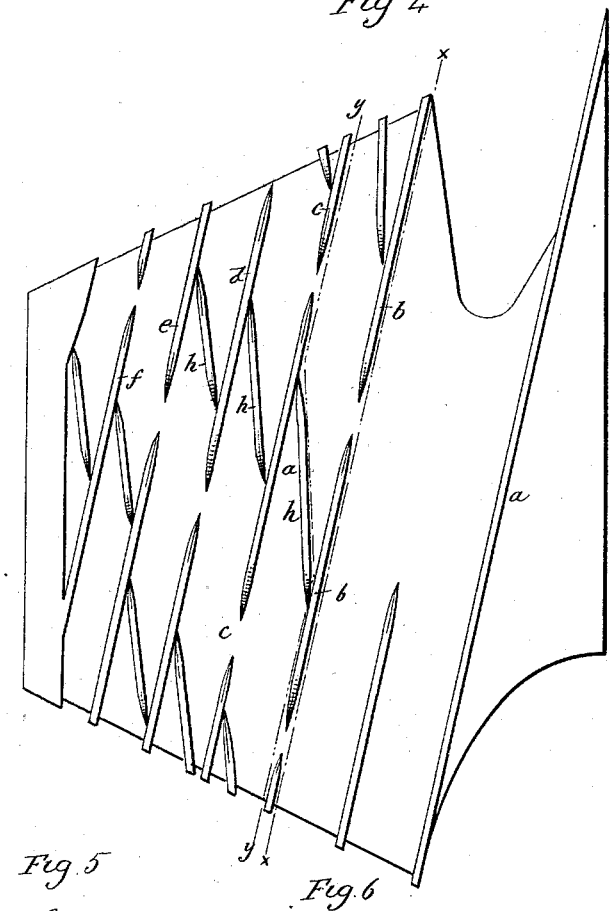
Figure 5:
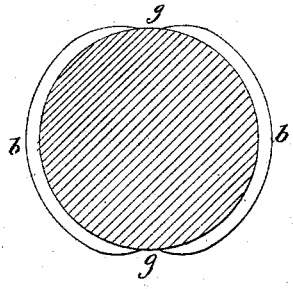
Figure 6:
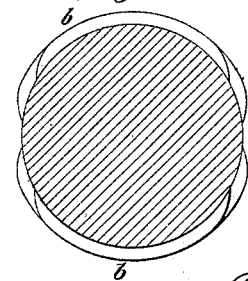

Figure 1, a longitudinal section of the case, showing the forcer in side view; Fig. 2, a longitudinal section of the case, the forcer removed, showing the ribs upon the interior surface of the case; Fig. 3, a side view of the forcer detached; Fig. 4, a diagram illustrating the surface of the forcer or the interior of the case; Fig. 5, a transverse section of the forcer, cutting on line $x\ x$ of Fig. 4, looking forward; Fig. 6, a sectional view on line $y\ y$ of Fig. 4.

This invention relates to an improvement in that class of meat-cutters which consists of a shell or case having an opening at one end for the introduction of meat and an escape at the opposite end for such meat after it has passed through the operation of cutting within the case and in which the meat is forced through the case and operated upon by a revolving forcer provided with spiral ribs, which work in conjunction with similar spiral ribs within the case, and so that by the revolution of the forcer the meat is not only driven through the case, but cut or disintegrated by the operation of the ribs on the forcer in conjunction with ribs in the case.

In meat-cutters of the character described there is a difficulty experienced in cutting meat which contains tough sinews. The sinews work into the spiral groove or grooves circumferentially and so as to escape the cutting action and clog the machine.

The object of my invention is to provide cutters which will prevent the sinews attaining that circumferential position and which will positively cut the sinews as the forcer revolves.

To this end the invention consists in providing the forcer or the case, or both, with spiral ribs, the inclination of which is from the entrance to the exit end of the machine, but the ribs not continuous, being divided at points in their circumference, so as to present sharp terminations at such division, and combining with such spiral ribs intermediate short ribs, such short ribs starting from near one of the spiral ribs and running obliquely therefrom to or toward the next rib, such intermediate ribs constructed with sharp terminations at the ends and so as to operate as cutters between the principal or spiral ribs, and as more fully hereinafter described.

In illustrating the invention I show it as applied to machines in which the case is of conical shape, diminishing in diameter from the entrance end toward the exit end, and the forcer of corresponding shape. This is a common shape of meat-cutter sufficient for the illustration of the invention, it being understood that the invention is applicable to forcers and cases having a uniform diameter from end to end.

A represents the case, which may be suitably supported upon a standard B or otherwise and is constructed at one end with a suitable hopper C, by which the meat or material to be cut may be introduced. The case is of conical shape and tapers from the entrance end toward the exit end. At the exit end the case may be provided or constructed with any of the known appliances for the discharge of meat. (Not essential to this invention.)

D represents the forcer, which is of a shape corresponding to the interior of the case and is attached to or made a part of the shaft E, supported in suitable bearings F at the entrance end and so that power may be applied thereto to impart revolution to the forcer, as usual in this class of meat-cutters.

In Fig. 4 I show a plan view of the surface of the forcer. Upon this surface is a series of ribs $a, b, c, d, e$, and $f$, more or less in number. These diagonal ribs (shown in Fig. 4) form a series of convolutions around the surface of the forcer, inclining toward the smaller or exit end. At the larger end the space between the first convolution of ribs forms a recess G, (see Fig. 1,) into which the meat may freely pass from the hopper, as usual in this class of meat-cutters.

Instead of making the diagonal or spiral ribs continuous, as in the more general construction of this class of machines, the ribs are made in short sections, as seen in Figs. 4 and 5, and so as to leave a space $g$ between the adjacent ends of the ribs. The adjacent ends of the ribs are tapered, so as to die out upon the surface and produce sharp edges, as seen in Figs. 4 and 5. These short ribs continue throughout the length of the forcer, as represented.

The interior of the case is constructed with an arrangement of ribs substantially the same as that on the forcer, as seen in Fig. 2. The diagram, Fig. 4, so far as the spiral ribs are concerned, may be understood to represent a plan or diagram of the arrangement of the ribs upon the inside of the case.

As the forcer revolves, the ribs on the forcer work in substantially-close contact with the ribs in the case, as usual with the ribs on the forcer and in the case in meat-cutters of this class; but by making the ribs in sections the spaces between the ends of the ribs afford an opportunity for the meat to advance into those spaces and then the sharp edges of the ends of the ribs operate as cutters thereon to cut the meat as it advances under the revolution of the forcer, and sinews or tough stringy parts, which would otherwise cling to the grooves of the forcer and simply follow the forcer round and round, will under the natural advance of the meat pass into these spaces to be severed by the cutting ends of the ribs.

As an additional provision for more completely cutting the meat and with special reference to meat of a tough, stringy, or sinewy character, I construct the forcer with intermediate ribs, as $h$. These ribs $h$ are arranged upon the surface of the forcer or in the case, or both, preferably starting from one rib at a point between its two ends and running obliquely, extend to the next rib at a point between its two ends, the sections of the principal ribs being arranged so as to offset the spaces in successive ribs or convolutions; but they do not make a surface connection with the principal ribs, but are tapered at their ends, so as to produce a sharp edge, as shown, adjacent to the principal ribs, thus permitting the meat as it advances to pass the end of these short ribs and so that those ends will strike the meat so passing and operate to positively cut the meat in similar manner as do the sharp ends or terminations of the sections of the principal ribs.

By the construction and arrangement of ribs which I have shown I produce a most perfect cutting and disintegration of the meat or material which passes through the machine before it reaches the end of the case, so that no manipulation at that end is necessary. The end of the case may be left open, as represented in Fig. 1, and so that the cut meat may escape freely at that end. Thus I avoid the necessity of any cutting device at the end of the machine, the cutting being wholly produced before the meat arrives at the delivery end.

I represent and prefer to shape the ribs or sections at both ends substantially alike; but it is essential only that the advancing end of the ribs should be tapered, so as to produce a sharp edge, substantially dying out upon the surface.

The principal or forcing ribs may be continuous, as usual in this class of machines, the intermediate ribs being applied to produce the cutting, as described, yet I prefer to make the principal or forcing ribs in sections, as described. In the case it is only essential that the ends of the ribs which are opposed to the revolution of the forcer should be brought to the sharp edge; but preferably both ends are made substantially alike, as shown.

It will be understood that either the forcer or the case may be provided simply with continuous or unbroken spiral ribs, while the other part will be constructed with the peculiar formation of ribs described; but the best result is attained by substantially the same formation of ribs on both the forcer and case.

I claim—

1. In a meat-cutter consisting of a case adapted to receive the material to be cut at one end and permit the discharge of the meat at the other end, and in which case a revolving forcer is arranged, so that by its revolution the meat will be driven from the entrance toward the exit end of the case, the forcer constructed with spiral ribs on its surface, inclining toward the discharge end of the case, the said ribs made in short sections and so as to leave a space between the ends of adjacent sections, the advancing end of the ribs tapered and so as to form a sharp edge substantially dying out upon the surface of the forcer, substantially as described.

2. In a meat-cutter consisting of a case adapted to receive the material to be cut at one end and permit the discharge of the meat at the other end, and in which case a revolving forcer is arranged, so that by its revolution the meat will be driven from the entrance toward the exit end of the case, the forcer constructed with spiral ribs inclining from the entrance end toward the discharge, combined with intermediate ribs on the surface of the forcer between the before-mentioned spiral ribs, the said intermediate ribs inclining from one rib rearward toward the next rib and the said intermediate ribs terminating and at their advancing ends tapered to form a sharp edge substantially dying out upon the surface of the forcer, substantially as described.

3. In a meat-cutter consisting of a case adapted to receive the material to be cut at one end and permit the discharge of the meat at the other end, and in which case a revolving forcer is arranged, so that by its revolution the meat will be driven from the entrance toward the exit end of the case, the forcer constructed with spiral ribs on its surface inclining toward the discharge end of the case, the said ribs made in short sections and so as to leave a space between the ends of adjacent sections, the advancing end of the rib-section tapered and so as to form a sharp edge substantially dying out upon the surface of the forcer, combined with intermediate ribs on the surface of the forcer between the before-mentioned spiral ribs, the said intermediate ribs inclining from one rib rearward toward the next rib and the said intermediate ribs at their advancing ends tapered to form a sharp edge substantially dying out upon the surface of the forcer, substantially as described.

4. In a meat-cutter consisting of a case adapted to receive the material to be cut at one end and permit the discharge of the meat at the other end, and in which case a revolving forcer is arranged so that by its revolution the meat will be driven from the entrance toward the exit end of the case, the case constructed with spiral ribs upon its inside, inclining toward the discharge end of the case, the said ribs made in short sections and so as to leave a space between the ends of adjacent sections, the ends of the sections opposed to the revolution of the forcer tapered and so as to form a sharp edge substantially dying out upon the surface of the case, substantially as described.

5. In a meat-cutter consisting of a case adapted to receive the material to be cut at one end and permit the discharge of the meat at the other end, and in which case a revolving forcer is arranged, so that by its revolution the meat will be driven from the entrance toward the exit end of the case, the case constructed with spiral ribs upon its inside, inclining toward the discharge end of the case, the said ribs made in short sections and so as to leave a space between the ends of the adjacent sections, the ends of the sections opposed to the revolution of the forcer tapered and so as to form a sharp edge substantially dying out upon the surface of the case, substantially as described.

6. In a meat-cutter consisting of a case adapted to receive the material to be cut at one end and permit the discharge of the meat at the other end, and in which case a revolving forcer is arranged, so that by its revolution the meat will be driven from the entrance toward the exit end of the case, the case constructed with spiral ribs upon its inside inclining toward the discharge end of the case, the said ribs made in short sections and so as to leave a space between the ends of the adjacent sections, the ends of the sections opposed to the revolution of the forcer tapered and so as to form a sharp edge substantially dying out upon the surface of the case, combined with intermediate ribs on the surface of the case between the before-mentioned spiral ribs, the said intermediate ribs inclining from one rib rearward toward the next rib, the ends of the said intermediate ribs opposed to the revolution of the forcer tapered and so as to form a sharp edge substantially dying out upon the surface of the case, substantially as described.

In testimony whereof I have signed this specification in the presence of two subscribing witnesses.

OLIVER D. WOODRUFF.

Witnesses:
 FRED. C. EARLE,
 JOHN E. EARLE.